No. 771,414. PATENTED OCT. 4, 1904.
R. B. BROWN.
GAS PURIFIER.
APPLICATION FILED FEB. 24, 1903.
NO MODEL.
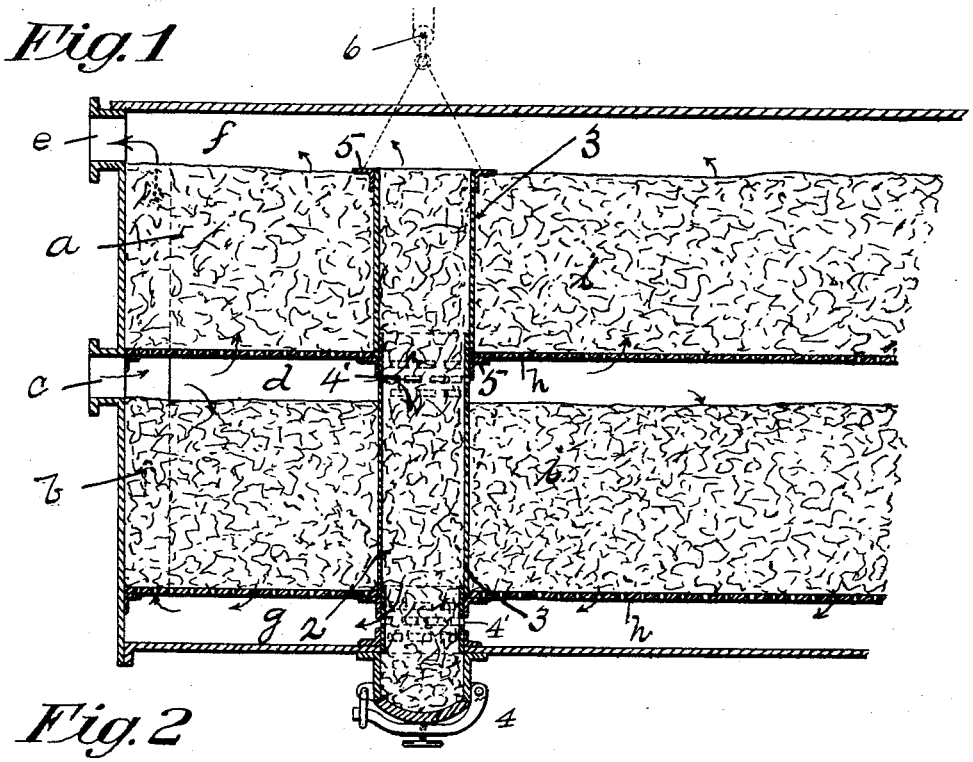
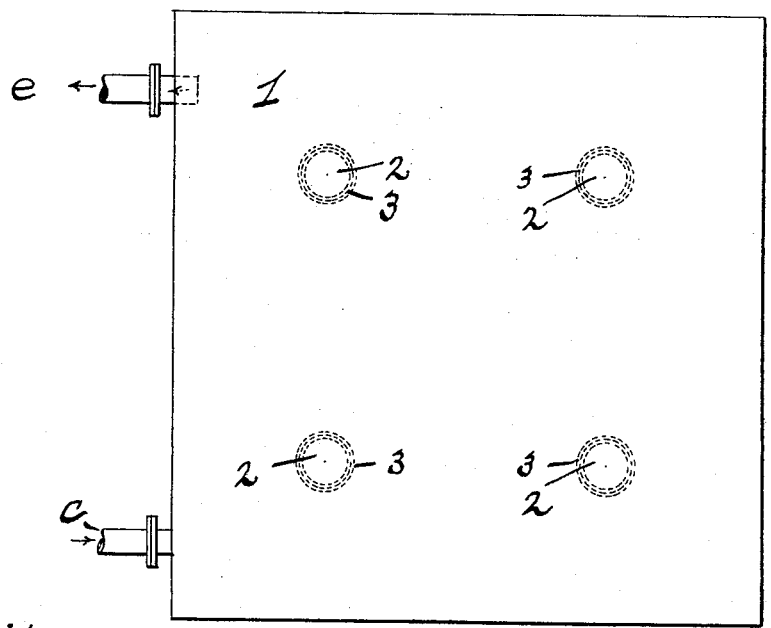
Witnesses:
C. A. Williams
James C. Herron
Inventor:
Rezean B. Brown
By John H. Roney
his Attorney.

No. 771,414.

Patented October 4, 1904.

UNITED STATES PATENT OFFICE.

REZEAU B. BROWN, OF MILWAUKEE, WISCONSIN.

GAS-PURIFIER.

SPECIFICATION forming part of Letters Patent No. 771,414, dated October 4, 1904.

Application filed February 24, 1903. Serial No. 144,759. (No model.)

*To all whom it may concern:*

Be it known that I, REZEAU B. BROWN, a citizen of the United States, residing at Milwaukee, in the county of Milwaukee and State of Wisconsin, have invented a new and useful Improvement in Gas-Purifiers, of which improvement the following is a specification.

My invention relates to gas-purifiers, and particularly to improved means for enabling the ready, quick, and safe removal of the spent purifying materials when necessary.

Heretofore, so far as I am aware, it has been a matter of serious difficulty to remove the spent materials from the purifier, it being necessary in some instances to remove a considerable portion of the material in order to expose the removable grids or crates on which the material was supported in the purifier and then by attaching the crates to some hoisting device bodily remove the crates and material then contained in the same. Another method employed was to dump the material vertically through the purifier by means of sectional doors or collapsible grids or crates operated from above. These doors, however, became clogged and difficult to open or maintain open during the discharging operation, requiring the expenditure of considerable time and labor, and in both cases the workmen were always exposed to gases constantly arising from the fouled material.

The object of my invention is to produce a purifier provided with means to quickly remove the materials and without encountering the difficulties occasioned in other constructions; and to accomplish this object my invention consists in the novel construction and arrangement of parts hereinafter described, reference being had to the accompanying drawings, which form a part of this specification, in which—

Figure 1 indicates a longitudinal section of my improved gas-purifier. Fig. 2 is a plan view of the same.

Referring to said drawings, 1 is a purifier for gas, which comprises two independent compartments $a\ b$. The purifier is provided with a gas-inlet $c$, which opens into the passage $d$ between the compartments $a\ b$, and with a gas-discharge $e$, which opens from the channel $f$ above the compartment $a$. A channel $g$ extends along the bottom of the purifier between the bottom thereof and the bottom of compartment $b$. Each of said compartments is provided with crates or grids $h$, of the usual construction, to support the purifying material $i$ therein. The said purifier is also provided with one or more vertically-disposed openings 2 2, which extend through both compartments thereof, in which metal tubes 3 3 are removably inserted, one fitting neatly over the other and constituting a continuous vertical passage through the purifier for the purpose of removing the spent material, as hereinafter specified, the lower end of said passage being closed by the cover 4. The said tubes are provided with perforations 4' 4' at a point opposite said channels $d$ and $g$ and are charged with purifying material, so that the gas is admitted thereto and the area of said tubes utilized for purifying purposes. The two upper tubes are provided with flanges 5 5 around their upper ends to admit of the hoisting appliance 6 being attached thereto to withdraw the same for the purpose hereinafter specified.

The operation of my improved device is as follows, viz: The purifying material is charged into the purifier in the usual manner and at the same time into the circular discharge-openings. The purifier is then closed in the usual manner. After the material is spent and it is necessary to remove the same the cover is removed, the man-head controlling the lower end of the discharge-passage is then opened and the material contained in the tubes or discharge-passage forced out of the same. The hoisting apparatus is then attached to the upper tube and said tube withdrawn. The contents of the upper compartment is then discharged through the opening or openings 2. The upper grid $h$ is removed and the next tube is then withdrawn and the contents of the second compartment is then removed in the same way.

The advantages of my improvement will be obvious to those skilled in this art.

I claim as my invention and desire to secure by Letters Patent—

1. A gas-purifier having a vertically-disposed removable discharge-tube extending through the same, the lower end of which is closed by a removable cover.

2. A gas-purifier comprising a plurality of superimposed compartments, each of which is provided with grids to support the purifying material, the said purifier having a gas-inlet and a gas-discharge pipe and having a spent-material-discharge opening comprising a plurality of tubes telescoped or inserted one in the other, the lower one of which is adapted to be closed by a cover.

3. A gas-purifier having a gas-inlet, a gas-outlet, and an opening for the discharge of the spent purifying material, in combination with a grid or support for the purifying material, and a removable tube juxtaposed to the discharge-opening aforesaid.

4. A gas-purifier having a gas-inlet, a gas-outlet, and an opening through the casing for the discharge of the spent purifying material, in combination with a grid or support for the purifying material, which is located above the bottom of said casing, said grid or support having an opening opposite the opening aforesaid, a closure for the opening in the casing, and a removable tube on the grid or support and the opening therein.

5. A gas-purifier having an opening, a removable discharge-tube extending through the purifying material, and arranged with an opening thereof adjacent the opening in the gas-purifier, and a closure for the opening.

In testimony whereof I have hereunto signed my name in the presence of two subscribing witnesses.

REZEAU B. BROWN.

In presence of—
FRED J. RUTLEDGE,
D. E. WRIGHT.